United States Patent [19]

Lunceford

[11] 4,400,271

[45] Aug. 23, 1983

[54] CAPTIVE AIR SYSTEM FOR WATER WELL

[76] Inventor: Randy L. Lunceford, P.O. Box 9743, Odessa, Tex. 79760

[21] Appl. No.: 291,902

[22] Filed: Aug. 11, 1981

[51] Int. Cl.³ .............................................. B01D 21/10
[52] U.S. Cl. ................................ 210/136; 210/170; 210/313; 210/533
[58] Field of Search ............... 210/112, 114, 136, 170, 210/313, 533–537, 540

[56] References Cited

U.S. PATENT DOCUMENTS

| | | | |
|---|---|---|---|
| 382,188 | 5/1888 | Pitt | 210/313 X |
| 578,686 | 3/1897 | Wright | 210/537 X |
| 1,119,882 | 12/1914 | Ryder | 210/535 |
| 1,407,936 | 2/1922 | Crosby | 210/533 X |
| 1,459,997 | 6/1923 | Shelly | 210/535 |
| 1,494,670 | 5/1924 | Delaney et al. | 210/535 |
| 1,496,090 | 6/1924 | Marker et al. | 210/533 X |
| 1,762,538 | 6/1930 | Worthington | 210/537 X |
| 2,002,407 | 5/1935 | Lemke | 210/533 |
| 2,061,781 | 11/1936 | Stein | 210/533 X |
| 2,423,793 | 7/1947 | Olivo et al. | 210/535 |
| 3,181,700 | 5/1965 | Hesson | 210/540 X |

*Primary Examiner*—Robert H. Spitzer
*Attorney, Agent, or Firm*—Marcus L. Bates

[57] ABSTRACT

A captive air system for a water well. A submersible type pump is located downhole in a wellbore for pumping water from an aquifer to the surface of the earth. A special storage tank is buried below the surface of the earth. The tank has a relatively short vertical leg connected to a relatively long lateral leg which slopes downwardly away from the vertical leg. A water supply conduit is located at the lower end of the lateral leg. The pump outlet is connected to the interior of the vertical leg. A blowdown pipe is connected to the bottom of the vertical leg. The edge portions of the tank which join together the vertical and lateral legs serve as a dam so that as the liquid level in the storage tank is lowered, debris always remain in the bottom of the vertical leg while clean fresh water is delivered by the lateral leg.

4 Claims, 3 Drawing Figures

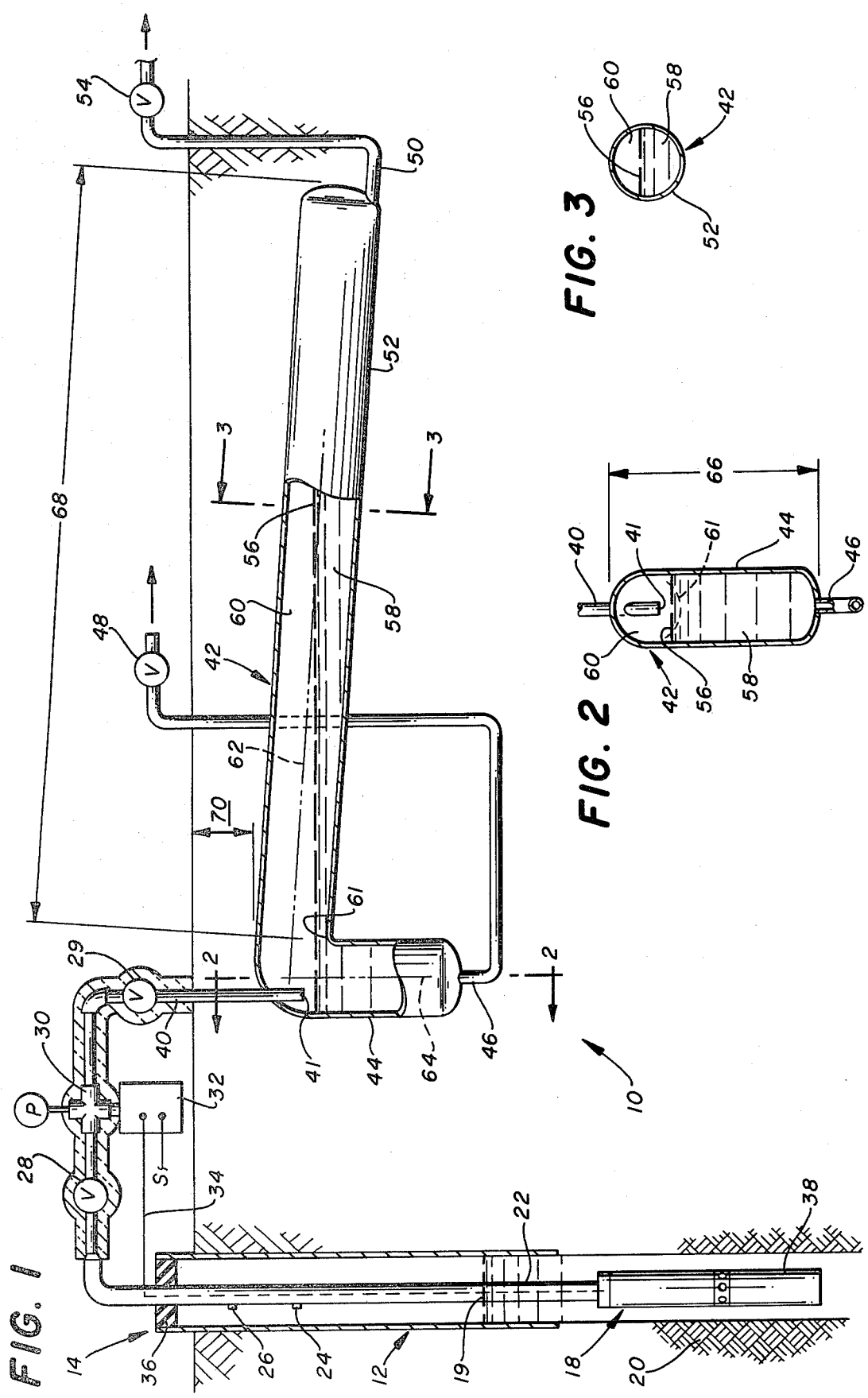

CAPTIVE AIR SYSTEM FOR WATER WELL

BACKGROUND OF THE INVENTION

Domestic and commercial water systems have grown extremely popular in recent years, namely because of the reliability of the submersible pump. The submersible pump is easily run downhole in a borehole into proximity of an aquifer so that water can be produced up through a tubing and into a storage tank. The storage tank has air captured in the upper extremity thereof to provide a sufficient head to force the water to flow to the point of consumption upon demand.

Most storage tanks are placed above the ground, and for this reason the water in the tank and the pipes leading to and from the tank often freeze during the winter time. Frozen pipes are one of the prime causes of trouble with a downhole pump of the submersible type.

Another drawback associated with downhole pumps is the accumulation of debris in the bottom of the tank which ultimately is delivered through the supply pipes and consumed.

It would be desirable to have a water storage tank fabricated in a manner to enable it to be conveniently buried below the frost line. It would also be desirable to have made available a water storage tank made in a manner whereby accumulated debris could be easily removed from the tank from time to time, thereby avoiding consumption of the debris.

A water supply system which overcomes the above drawbacks and enjoys the above mentioned desirable benefits is the subject of the present invention.

PRIOR ART

Gentry U.S. Pat. No. 3,853,766 discloses a tank which has a dropped trap area at one end thereof. Seidel U.S. Pat. No. 3,770,623 shows an inclined bottom on a tank. However, neither of these references, taken jointly or singularly teach building a water supply having an underground tank flow system of a configuration taught by Applicant.

SUMMARY OF THE INVENTION

This invention comprehends a water well system having a downhole pump located below the water level in a borehole for supplying water to a storage tank. The storage tank has a relatively short vertical leg connected to a relatively long lateral leg. The lateral leg downwardly slopes away from the vertical leg.

The pump outlet is connected to the interior of the vertical leg so that during the pumping of water into the tank, debris settle into the bottom of the vertical leg. The upper end of the vertical and lateral legs communicate with one another and provide an air cushion within which air is trapped for providing a head so that water is forced to flow from the tank to the point of consumption.

A supply pipe is connected to the bottom of the interior of the outermost end of the lateral leg so that all of the water within the lateral leg is available for consumption.

The interior edge of the tank which is formed by joining the lateral and vertical legs together form a divider. As water flows from the pump into the vertical leg of the storage tank, the liquid level rises within the vertical leg and eventually spills over the divider into the lateral leg, and accordingly, a common liquid level is then formed which separates the liquid phase from the gas phase within the tank. As the liquid level falls, the water level reaches the divider, whereupon the common compartment located in the upper end of the tank constitutes the gaseous phase, with there being two separate compartments having liquid phases separated from one another by the baffle.

The pump outlet flows into the vertical leg where debris separate from the water and accumulate therein. A blow-down line is connected to the bottom extremity of the vertical leg and enables the debris to be removed from time to time.

The storage tank is buried below the surface of the ground, preferably below the frost line, so that the various problems usually associated with freezing is obviated. Moreover, the flow lines leading to the tank are insulated in the event they are not buried.

Accordingly, a primary object of the present invention is the provision of a water well system which includes a storage tank which separates debris from the stored water and prevents the debris from being consumed.

Another object of the present invention is the provision of a water well system having a storage tank of the captive air type especially adapted to be buried below the surface of the ground and which is easily cleaned of debris which may accumulate therein from time to time.

Still another object of the present invention is the provision of a water well system of the captive air type which includes a common gas phase and two separate compartments for a liquid phase with one of the compartments being a settlement chamber.

Still another and further object of the present invention is the provision of an improved storage tank apparatus of the captive air type which provides clean, fresh water and at the same time avoids many of the problems associated with the prior art storage tanks.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a part diagrammatical, part schematical, part cross-sectional view of a water well system made in accordance with the present invention;

FIG. 2 is a cross-sectional view taken along line 2—2 of FIG. 1; and,

FIG. 3 is a cross-sectional view taken along line 3—3 of FIG. 1.

DETAILED DESCRIPTION OF THE PREFERRED EMBODIMENT

In the figures of the drawings, there is disclosed in FIG. 1 a water well system 10. The system includes the usual borehole which can be cased as noted by numeral 12. The casing terminates in a wellhead 14, preferably located above ground level.

A submersible type pump 18 is located downhole in the borehole below the liquid level 19. Numeral 20 generally indicates an aquifer which provides water for the pump. Other type pumps, such as jet pumps, rod pumps, and the like can also be advantageously used in conjunction with the present invention.

A pair of prior art check valves 24 and 26 are arranged in spaced relationship respective to one another, so that after the pump has cycled, a small stream of water can exit at 24 while air enters the system at 26; consequently, during the next cycle of operation, a short leg of air will be transferred into the storage tank 42 of the present invention, the details of which will be more fully discussed later on in this disclosure.

Valve 28 preferably is located upstream of a double pipe T 30. A control 32 of conventional design is connected to the production pipe and to a suitable source of electrical current. An electrical conductor 34 extends through packing 36 and to a motor 38 of the submersible pump so that the control actuates the pump motor at the appropriate time.

Valve 29 is placed within pipe 40 which has an outlet 41 disposed within storage tank 42, made in accordance with the present invention. The storage tank includes a relatively short vertical leg 44 which terminates at the lower end thereof as a blow-down or drain 46. The drain system includes a valve 48 located above the ground level.

A supply pipe 50 is connected to the outermost and lowermost interior position of a lateral leg 52 and includes a valve 54 leading to the point of water consumption.

Both the vertical and lateral legs of the tank include a water level 56 which separates a liquid phase 58 from a gaseous phase 60. The lower edge portion 61 where the vertical and lateral legs are joined together provides a divider which separates the liquid contained within the vertical and lateral legs from one another when the liquid level 56 recedes below the divider 61. Accordingly, when the tank is full, the interior thereof is comprised of a common gaseous phase and a common liquid phase, noting that liquid level 56 is common to both legs in this instance. However, when the liquid level 56 recedes below the edge of the divider 61, there is formed two separate liquid levels, and the liquid level of the lateral leg in this instance can continue to recede substantially far below the liquid level of the vertical leg as water continues to be used through valve 54.

Numeral 62 indicates the longitudinal axial centerline of the lateral leg while numeral 64 indicates the longitudinal axial centerline of the vertical leg. The two centerline instersect one another at an angle less than 90°, noting that the lateral leg is bent below the horizontal when the vertical leg is vertically aligned respective to the horizontal.

Numeral 66 of FIG. 2 illustrates the vertical height or length of the vertical leg of the tank, while numeral 68 of FIG. 1 indicates the length of the lateral leg. Numeral 70 illustrates the depth that the storage tank is buried below the surface of the ground.

When the pressure within the storage tank is reduced to a predetermined amount, for example 40 psi, controller 32 connects the illustrated source S of current to the pump motor 38, thereby energizing the pump and causing water to flow up the production tubing 22. Air captured between check valves 24 and 26 is forced up through the production tubing, through the open valves 28 and 29, and into the vertical leg 44 of the storage tank. The liquid level within the storage tank commences to rise, with any debris produced by the pump being accumulated in the bottom of the vertical leg. The liquid level continues to rise until the pressure of the air within the gas phase 60 reaches a predetermined amount, preferably 60 psi, whereupon the controller 32 interrupts the flow of current to the motor. At this time, the bleed valve 24 will open, permitting air to enter check valve 26, so that a short leg of air is provided. As water is consumed through supply line 50, the liquid level 56 again recedes below the divider 61, and no matter how much of the liquid 58 is consumed, there will be no contaminates flowing through line 50 because the contaminated water is captured within the vertical leg. From time to time, valve 48 is opened in order to translocate the debris contained within the lower chamber of the vertical leg out of the storage tank.

It is preferred to insulate all of the above ground connections so as to enable the valves 28, 29, and 48 to be readily available, and to enable the pump to be easily serviced without incurring unnecessary labor charges. However, as another embodiment of this invention, it is sometimes desirable to bury the piping at 28, 29, 30, 39, and 40, especially where the winter temperatures are severe. Access to the valves can be provided as may be desired in this instance.

The storage tank can be buried 8–10" below the surface of the earth in geographical locations having mild winters, as found in Odessa, Tex., for example. The lateral and vertical legs may be made 12" in diameter where the vertical leg is 24" in length and the lateral leg is 8–12 feet in length. A tank capacity of 80–100 gallons is adequate for most domestic purposes.

The present water system provides a trouble free supply of uncontaminated water for either domestic or commercial use.

I claim:

1. In a water well system of the type having a downhole pump supported downhole in a borehole below the water level thereof for supplying water to a storage tank, the improvement comprising:

said storage tank has a vertical leg connected to a lateral leg, said lateral leg is relatively longer than said vertical leg, said lateral leg has an interior end portion connected to an upper interior end portion of said vertical leg and slopes downwardly in a direction away from said vertical leg;

a first pipe for connection from a pump outlet to the interior of the vertical leg of said tank, a supply pipe connected to supply water from the lowermost and outermost interior part of the lateral legs;

and a blow-down pipe connected to the lowermost interior part of the vertical leg for removing debris therefrom;

means forming an air space which extends from the top of said vertical leg and across the upper end of said lateral leg, and means forming one liquid space at the bottom of said vertical leg and another liquid space at the bottom of said lateral leg, means by which the recited one and another liquid spaces are joined to one another at the location where the lateral and vertical legs are joined together, when the liquid level is above the said location;

the air space within the tank is maintained at a suitable volume by two spaced check valves placed within said first pipe which enables air to displace a small amount of water each pump cycle.

2. The improvement of claim 1 wherein said storage tank is buried below the surface of the ground with said vertical leg being arranged in an upright position and with the lateral leg downwardly sloping away from the upper end of the vertical leg.

3. The improvement of claim 2 wherein said vertical leg forms a debris containing chamber which is removed therefrom by flowing water through sid blowdown pipe.

4. The improvement of claim 1 wherein the location where the vertical and lateral legs are joined together forms a divider which divides the water in the vertical leg from the water in the lateral leg and leaves the recited air chamber which is common to the liquid level in both the vertical and lateral legs.

* * * * *

UNITED STATES PATENT AND TRADEMARK OFFICE
CERTIFICATE OF CORRECTION

PATENT NO. : 4,400,271
DATED : AUGUST 23, 1983
INVENTOR(S) : RANDY L. LUNCEFORD

It is certified that error appears in the above—identified patent and that said Letters Patent is hereby corrected as shown below:

Column 1, line 9, correct the spelling of "aquifer";
Line 37, correct the spelling of "bottom";
Line 40, insert --and-- after "tank".

Column 3, line 26, substitute --portion-- for "position";
Line 48, substitute --lines-- for "line".

Column 5, line 3, substitute --said-- for "sid".

Signed and Sealed this

Twenty-first Day of August 1984

[SEAL]

Attest:

GERALD J. MOSSINGHOFF

Attesting Officer  Commissioner of Patents and Trademarks